United States Patent [19]

Otani

[11] Patent Number: 4,628,507
[45] Date of Patent: Dec. 9, 1986

[54] BIT ERROR DETECTION CIRCUIT FOR PSK-MODULATED CARRIER WAVE

[75] Inventor: Susumu Otani, Tokyo, Japan

[73] Assignee: NEC Corporation, Tokyo, Japan

[21] Appl. No.: 599,362

[22] Filed: Apr. 12, 1984

[30] Foreign Application Priority Data

Apr. 18, 1983 [JP] Japan .................................. 58-67024

[51] Int. Cl.[4] ...................... H04B 17/00; G06F 11/00
[52] U.S. Cl. ........................................... 371/5; 375/34
[58] Field of Search ................... 371/5, 6, 68; 375/34, 375/57, 58, 10

[56] References Cited

U.S. PATENT DOCUMENTS

| | | | |
|---|---|---|---|
| 4,034,340 | 7/1977 | Sant' Agostino | 371/5 X |
| 4,188,615 | 2/1980 | Tan | 371/4 |
| 4,200,838 | 4/1980 | Poitevin | 371/5 X |
| 4,218,771 | 8/1980 | Hogge, Jr. | 371/61 X |
| 4,247,938 | 1/1981 | Kurihara et al. | 371/5 |
| 4,367,550 | 1/1983 | Douverne | 371/5 |
| 4,375,099 | 2/1983 | Waters et al. | 371/6 |

OTHER PUBLICATIONS

S. Takenaka et al., Bit Error Rate Monitor for Four Phase PSK Systems, Intl. Conf. on Communications, Seattle, WA, Jun. 8-12, 1980, pp. 25.1-25.6.

B. J. Leon et al., A Bit Error Rate Monitor for Digital PSK Links, IEEE Trans. on Comm., vol. COM-23, No. 5, May 1975, pp. 518-525.

Primary Examiner—Charles E. Atkinson
Attorney, Agent, or Firm—Sughrue, Mion, Zinn, Macpeak and Seas

[57] ABSTRACT

A bit errror detection circuit for checking the quality of a transmission path by accurately predicting a true bit error rate (BER) despite changes in the operating point of a non-linear element or fluctuations in the level of an input signal. An inputted PSK-modulated carrier wave is separately phase demodulated by a recovered carrier wave and a phase modulated carrier wave. These two phase demodulated PSK-modulated carrier waves are inputted into separate discriminator circuits 412 and 413 having a common discrimination level where the difference between the outputs can be compared by the comparator circuit 409 to predict a true BER.

2 Claims, 12 Drawing Figures

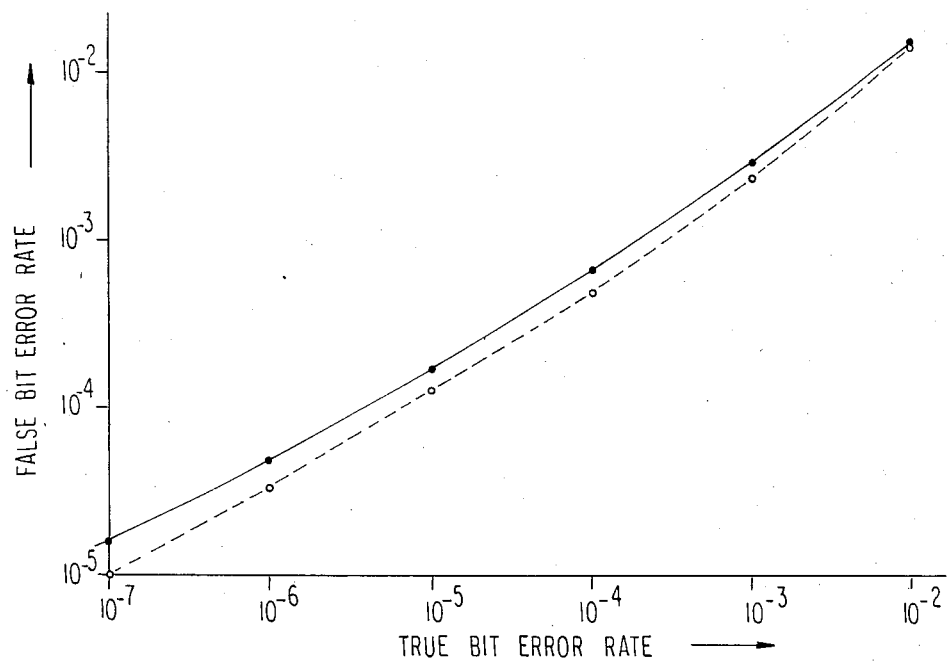
FIG.6
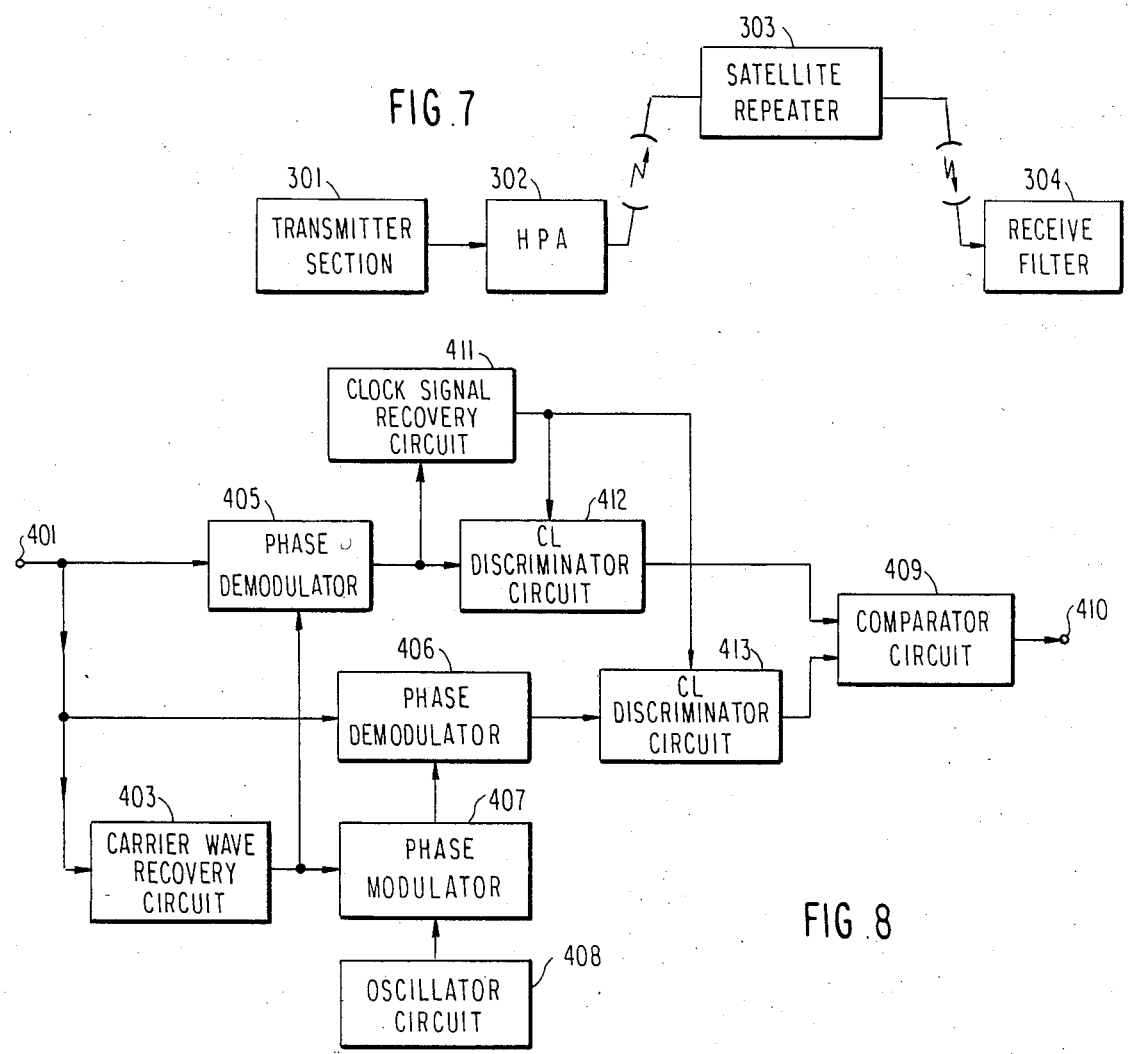
FIG.7
FIG.8

OUTPUT OF
DEMODULATOR
405

OUTPUT OF
DEMODULATOR
406

BIT ERROR DETECTION CIRCUIT FOR PSK-MODULATED CARRIER WAVE

BACKGROUND OF THE INVENTION

The present invention relates to a bit error detection circuit for use in a digital communication system such as a TDMA (Time Division Multiplex Access) communication system, which checks the quality of a transmission path or line.

Generally, it is often required in digital communications lines to constantly monitor bit error rate (BER) on receiving lines. However, directly determining a BER from a received signal is in many cases impossible because the tranmsitted data is unknown. More accepted, therefore, is a method which predicts a BER of a received signal from information provided by comparing a main reproduced signal with a signal having a falsely deteriorated characteristic.

A prior art bit error detection circuit of the type described comprises, for example, first and second discriminator circuits adapted to discriminate an output of a phase demodulator with respect to first and second different reference voltages respectively, and a circuit for measuring a false BER by comparing an output of the first discriminator circuit with an output of the second discriminator circuit. A problem encountered with such a circuit construction is that in the TDMA communication of a burst PSK (phase Shift Keying) modulated carrier wave for example, the burst carrier wave level and, therefore, the predicted BER differs from one station to another.

Another prior art bit error detection circuit comprises first and second discriminator circuits adapted to discriminate the output of a phase demodulator at a time corresponding to the center $\theta_0$ of data (bit) and a time deviated by a phase $\theta_1$ from the center $\theta_0$ respectively, and a circuit for measuring a pseudo BER by comparing the output of the second discriminator circuit with the output of the first discriminator circuit. This is not acceptable in the case of a transmission line which includes a high power amplifier or like non-linear element because, as will be described in detail, the operating point of a non-linear element changes depending upon the operation mode, i.e. linear mode or non-linear mode. Such is presumably attributable to a change in the amount of variation in intersymbol interference from the phase point $\theta_0$ to the phase point $\theta_0$.

SUMMARY OF THE INVENTION

It is therefore an object of the present invention to provide a bit error detection circuit which is capable of stably predicting a BER on a transmission line even when the operating point of a non-linear element on the transmission line fluctuates.

In accordance with the present invention, there is provided a bit error detection circuit comprising first demodulator means supplied with a reference carrier wave for phase-demodulating an input PSK modulated carrier wave into a first demodulated signal; carrier wave recovery means for recovering the reference carrier wave to the input PSK modulated carrier wave for the first; clock signal recovery means for a clock signal in response to the first demodulated signal; oscillator means; modulator means for phase-modulating the reference carrier wave with the output of the oscillator means; second demodulator means supplied with the output of the modulator means for phase-demodulating the input PSK modulated carrier wave into a second demodulated signal; first discriminator means for discriminating the first demodulated signal into a first digital signal in response to the clock signal; second discriminator means for discriminating the second demodulated signal into a second digital signal in response to the clock signal; and comparator means for comparing the first digital signal with the second digital signal to provide a bit error detection signal.

BRIEF DESCRIPTION OF THE DRAWINGS

The present invention will be described in detail with reference to the accompanying drawing in which:

FIG. 6 is a graph showing the relationship between a false (pseudo) BER and a true BER provided by the circuit of FIG. 4;

FIG. 7 is a block diagram of a model transmission line of the type including a non-linear element;

FIG. 8 is a block diagram of a bit error detection circuit embodying the present invention;

DETAILED DESCRIPTION OF THE PREFERRED EMBODIMENT

Figure 1:
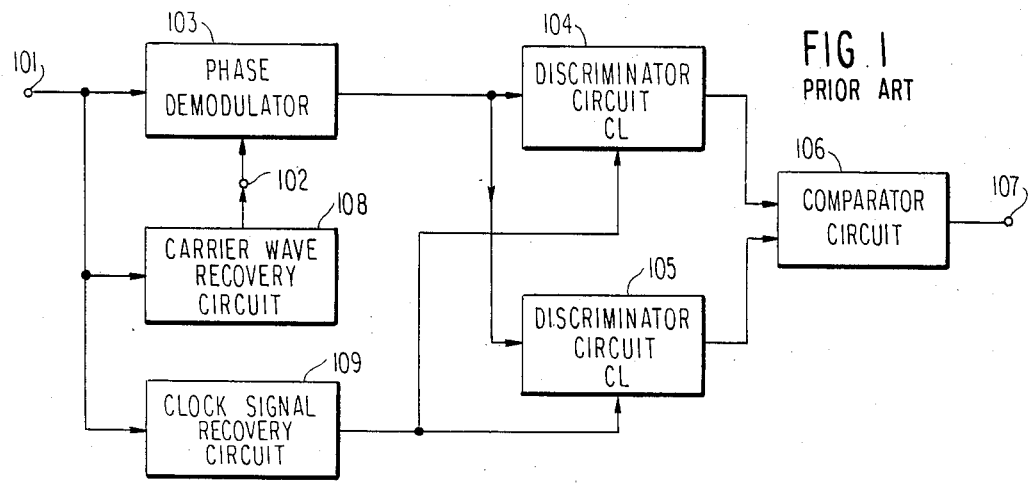
FIG. 1 is a block diagram of a prior art bit error detection circuit.

Referring to FIG. 1(a) showing in block an example of prior art bit error detection circuits of the type described, the bit error detection circuit comprises a modulated carrier wave input terminal 101, a recovered carrier wave input terminal 102, a 2-phase phase demodulator 103, a first discriminator circuit 104, a second discriminator circuit 105, a comparator circuit or an Exclusive-OR circuit 106, a pseudo error output terminal 107, a carrier recovery circuit 108 and a clock signal recovery circuit 109.

Figure 2:
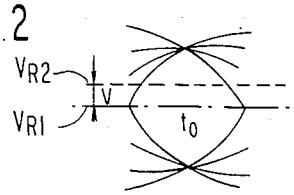
FIG. 2 is a diagram showing an eye pattern and a threshold level of the circuit shown in FIG. 1.

In FIG. 1, a 2-phase PSK modulated carrier wave coming in through the terminal 101 is applied to the demodulator 103, the carrier wave recovery circuit 108 and the clock signal recovery circuit 109. The demodulator 103 demodulates the modulated carrier wave with a recovered carrier wave supplied from the circuit 108 (comprising a frequency multiplier, a filter and a frequency divider, for example). The demodulator output has an eye pattern shown in FIG. 2. The discriminator 104 discriminates the demodulator output with respect to a threshold level (for example, $V_{R1}=0$ volt) set at the center of the eye pattern shown in FIG. 2, and samples it at an optimum time point $t_0$ which is the center of each data bit. The discriminator 105 similarly discriminates the demodulator output with respect to a threshold level offset at $V_{R2}=V$ volt as shown in FIG. 2, and samples it at the optimum time point $t_0$. Each of the discriminators 104 and 105 comprises a voltage comparator and a sampler. In this construction, the output of the discriminator 105 is larger in bit error rate than the output of the discriminator 104. Therefore, the pseudo BER at the output of the discriminator 105 can be measured by comparing the output of the discriminator 105 with the output of the discriminator 104 in comparator 106. In this manner, it is possible to measure the pseudo BER of the output of the discriminator 105 by counting error pulses which appears at the terminal 107 (or the output of the comparator 106). It follows that a true BER of the output of the discriminator is predictable by the use of, for example, a conversion table representative of the relationship in BER between outputs of the discriminators 104 and 105 which is determined in advance.

Figure 3:
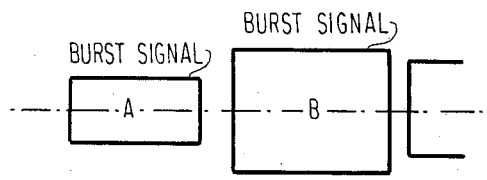
FIG. 3 is a diagram showing an example of received burst signal levels.

However, in TDMA satellite communications or the like, the received burst signal level differs from one station to another as represented by those of stations A and B in FIG. 3. Because the threshold level assigned to the discriminator 105 is V volts which is constant, a presumed BER for the station A is different from one for the station B. For this reason, although the prior art circuit of FIG. 1 may solve the above problem by employing an automatic gain control (AGC) circuit at a stage ahead of the demodulator in the case of a continuous signal, it is ineffective for a system in which the received signal level changes between bursts. For details of such a circuit, reference may be made to U.S. Pat. No. 4,188,615 issued Feb. 2, 1980 and assigned to NEC Corporation.

Figure 4:
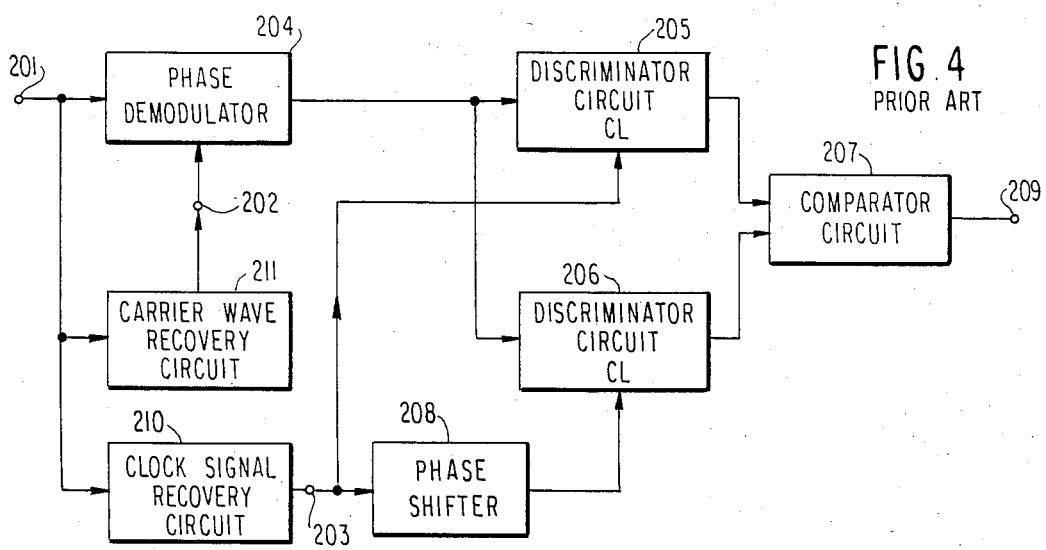
FIG. 4 is a block diagram of another prior art bit error detection circuit.

Referring to FIG. 4, another prior art bit error detection circuit is shown, which is free from the drawback discussed above. The bit error detection circuit comprises a modulated wave input terminal 201, a recovered carrier wave input terminal 202, a clock signal input terminal 203, a phase demodulator circuit 204, a first discriminator 205, a second discriminator 206, a comparator circuit 207, a phase shifter circuit 208, a pseudo error output terminal 209, a clock signal recovery circuit 210, and a carrier wave recovery circuit 211.

Figure 5:
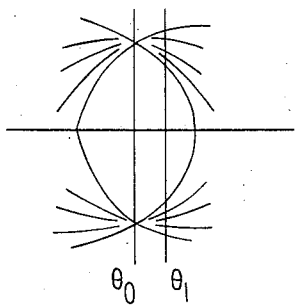
FIG. 5 is a diagram representing the relationship between an eye pattern of the circuit shown in FIG. 4 and phase points assigned to decision circuits.

In FIG. 4, a PSK modulated carrier wave arriving at the terminal 201 is phase-demodulated with the recovered carrier wave supplied to the phase demodulator 204 as a reference. The output of the demodulator 204 is supplied to the discriminators 205 and 206. A clock signal is supplied to the terminal 203 from the clock signal recovery circuit 210 and is synchonous with the PSK modulated carrier wave. The clock signal is applied to the first discriminator 205 which then discriminates the demodulator output with respect to a phase $\theta_0$ of the center of an eye pattern or the center of each bit shown in FIG. 5. The clock signal is also supplied to the phase shifter 208 to be phase-shifted by $\theta_1$. The output of the phase shifter 208 is fed to the discriminator 206 which then discriminates the demodulator output with respect to a phase point $\theta_1$ shown in FIG. 5. Generally, the result of discrimination at the phase point $\theta_1$ involves a greater error than the result of discrimination at the phase point $\theta_0$. Utilizing this, the output of the discriminator 206 is compared with the output of the discriminator 205, to provide a true BER of the output signal of the discriminator 205 (or the output appearing at the pseudo error output terminal 209). Each of the discriminators may comprise a voltage comparator and a sampler, or a flip-flop.

In FIGS. 1 or 4, the clock signal recovery circuit may provide a clock signal in response to the output of the phase demodulator. Also, the carrier wave recovery circuit may comprise an error signal generating circuit responsive to the output of the phase demodulator, a lowpass filter responsive to the output of the generating circuit, and a voltage controlled oscillator responsive to the output of the lowpass filter for providing a carrier wave.

However, a non-linear element such as a high power amplifier is often included in the transmission line, the operating point of the non-linear element fluctuates during operation. A model transmission line with a non-linear element is shown in a block diagram in FIG. 7. The elements illustrated in FIG. 7 comprise a transmitter section 301, a high power amplifier (HPA) 302, a satellite repeater 303 including an amplifier (TWTA), and a receiving filter 304. In this drawing, both the TWTA and HPA comprise non-linear elements. FIG. 6 illustrates a graph of the relationship between a false BER and a true BER in the bit error detection circuit of FIG. 4, which was obtained by calculation under the conditions: transmission spectrum=40% root Nyquist spectrum, receiving filter=40% root Nyquist characteristic, $\theta_1-\theta_0=40$ degrees, and (HPA/TWTA)$_{IBO}=30^{dB}/30^{dB}$ and $10^{dB}/2^{dB}$. Here, (HPA/TWTA)$_{IBO}$ is an input backoff of HPA and TWTA. It will be seen from FIG. 6 that the pseudo error probability characteristic differs from a linear mode (HPA/TWTA)$_{IBO}=30^{dB}/30^{dB}$ indicated by a dashed line and a non-linear mode (HPA/TWTA)$_{IBO}=10^{dB}/2^{dB}$ indicated by a solid line. This is derived from the fact that the code discrimination occurs at different times. That is, presumably, the amount of change in the distribution of intersymbol interference differs from the phase point $\theta_0$ to the phase point $\theta_1$, because the operating point of the non-linear element in the linear mode and that in the non-linear mode are different from each other. Consequently, the prior art circuit shown in FIG. 4 is not effectively applicable to a system which includes any non-linear elements in its transmission line even, though free from the influence of the signal level deviation between bursts. Concerning the circuit of FIG. 4, reference may be made to Mizuno et al, "Error Rate Monitoring System for TDMA Satellite Communications Using Offset Sampling", Institute of Electronics and Communication Engineers of Japan, Data No. CS82-74, pp. 45-52, 1982.

Figure 8A:
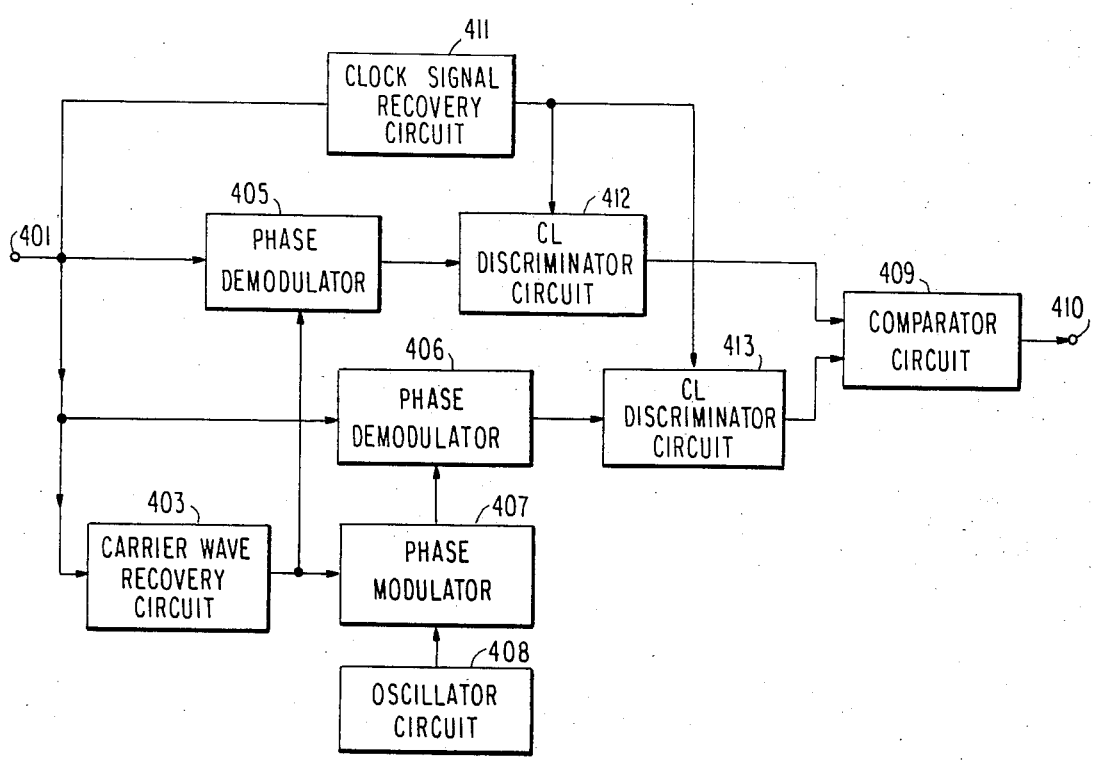
FIG. 8A is a block diagram illustrating a variation of FIG. 8.

FIG. 8 illustrates a block diagram of a bit error detection circuit embodying the present invention. The circuit comprises an input terminal 401, a carrier wave recovery circuit 403, first and second phase demodulators 405 and 406, a phase modulator 407, an oscillator 408, a comparator circuit 409, an output terminal 410, a clock signal recovery circuit 411, and discriminator circuits 412 and 413 having a common discrimination level. The carrier wave recovery circuit 403 comprises a frequency multiplexer for multiplying, for example, an N-phase phase modulated carrier wave by "N", a filter for picking up the N-multiplied frequency and a divider for dividing the output of the filter by "N". The clock recovery circuit 411 is made up of a delay circuit for delaying a demodulated signal by half a bit, a multiplier for multiplying the demodulator output and the output of the delay circuit, a tuning circuit synchronous to a clock component of the output of the multiplier, and a circuit for wave-shaping the output of the tuning circuit to provide a recovered clock pulse. It is also possible to extract the clock signal out of the input modulated carrier wave, as shown in FIGS. 1, 4 or 8A.

In FIG. 8, an input PSK modulated carrier wave coming in through the input terminal 401 is supplied to the phase demodulators 405 and 406 and the carrier recovery circuit 403. The recovered carrier wave from the circuit 403 is applied to the phase demodulator 405 to phase-demodulate the PSK modulated carrier wave. The recovered carrier wave is also phase modulated by to the phase modulator 407 in response to the output signal of the oscillator 408. The output of the phase modulator 407 is delivered to the phase demodulator 406 which then phase-demodulates the modulated carrier wave. The output of the demodulator 405 is applied to the discriminator circuit 412, while the output of the demodulator 406 is applied to the discriminator circuit 413. In response to the recovered clock signal, each of the discriminator circuits 412 and 413 discriminates the output of the demodulator associated therewith at the center of the bit. The outputs of the circuits 412 and 413 are commonly delivered to the comparator 409 whose output appears at the terminal 410 as a pseudo error signal.

Figure 9A:
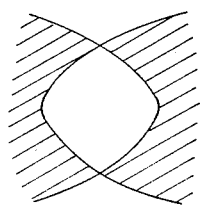
FIGS. 9A and 9B are diagrams showing exemplary eye patterns attainable with phase demodulators included in the circuit of FIG. 8.
Figure 9B:
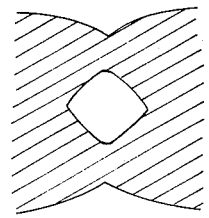
Figure 10:
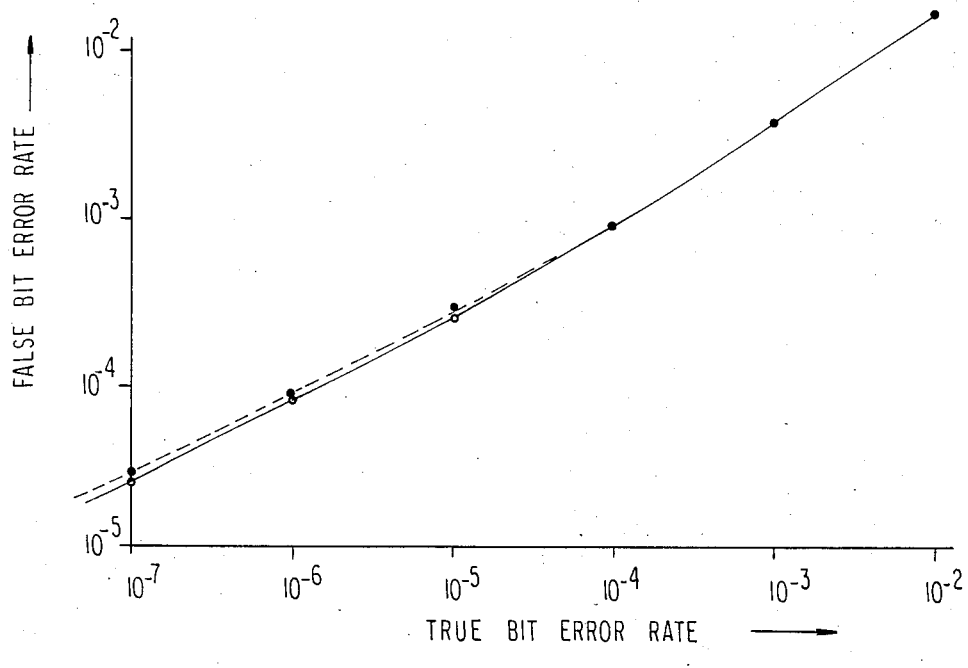
FIG. 10 is a graph representing the relationship between a false BER and a true BER in accordance with the circuit of FIG. 8.

Let it be assumed that the signal incoming at the input terminal 401 is a 4-phase PSK modulated carrier wave $a(t) \sin \omega_c t + b(t) \cos \omega_c t$, and the recovered carrier wave output from the carrier wave recovery circuit 403 is $\sin \omega_c t$. Then, the first phase demodulator 405 develops output signals $a(t)$ and $b(t)$. Meanwhile, assuming that the output signal of the phase modulator 407 is $\sin (\omega_c t + \theta(t))$ (where $\theta(t)$ is a quantity of phase fluctuation), the second phase demodulator 406 develops an output signal $a(t) \cos \theta(t) - b(t) \sin \theta(t)$ and $a(t) \sin \theta(t) + b(t) \cos \theta(t)$. Outputs of the first and second phase demodulators 405 and 406 are shown in eye patterns in FIGS. 9A and 9B. A pseudo BER of the output of the demodulator 406, therefore, can be measured from the output signal at the output terminal 410 by taking the output signals of the phase demodulators 405 and 406 at the optimum timing by the discriminator circuits and comparing them in the comparator 409. The pseudo BER allows a true BER of an output of the demodulator 405 to be predicted. Such comparison made at the same time instant will cause hardly any deterioration of the operating characteristics even if the operating point of a non-linear element on the transmission line is changed. FIG. 10 is a graph showing a relationship between a false BER and a true BER of a PSK modulated carrier wave passed through the transmission line of FIG. 7, attained by calculation with the bit error detector shown in FIG. 8. The calculation was performed under the following conditions: transmission spectrum=40% root Nyquist spectrum, a receiving filter=40% root Nyquist characteristic, $\theta(t) \leq 1.7$ degrees, and $(APA/TWTA)_{IBO} = 30^{dB}/30^{dB}$ (dashed line) and $10^{dB}/2^{dB}$ (solid line. As will be apparent from FIG. 10, the circuitry in accordance with the present invention is advantageous over the prior art circuitry shown in FIG. 4 in that it is capable of predicting a true BER more accurately despite the change in the operating point of a non-linear element. Furthermore, the prediction is free from the influence of the change in input level because the threshold level is set at the center of an eye pattern.

In summary, it will be seen that the present invention provides a bit error detection circuit which is effective in reducing error in the prediction of a true BER of a received and reproduced signal relative to a false BER due to the fluctuation in the level of an input signal or in the operating point of a non-linear element.

What is claimed is:

1. A bit error detection circuit for a PSK modulated carrier wave, comprising:
   carrier wave recovery means (403) for recovering a reference carrier wave of an inputted PSK modulated carrier wave;
   first demodulator means (405) responsive to the recovered reference carrier wave for phase-demodulating said input PSK carrier wave into a first demodulated signal;
   clock signal recovery means (411) for providing a clock signal in response to the first demodulated signal;
   oscillator means;
   modulator means (407) for phase-modulating the reference carrier wave with the output of the oscillator means (408);
   second demodulator means (406) responsive to the output of said modulator means for phase-demodulating the input PSK modulated carrier wave into a second demodulated signal;
   first discriminator means (412) for discriminating the first demodulated signal into a first digital signal in response to the clock signal;
   second discriminator means (413) for discriminating the second demodulated signal into a second digital signal in response to the clock signal; and
   comparator means (409) for comparing the first digital signal with the second digital signal to provide a pseudo bit error detection signal.

2. A bit error detection circuit for a PSK-modulated carrier wave, comprising:
   carrier wave recovery means (403) for recovering a reference carrier wave of an inputted PSK modulated carrier wave;
   first demodulator means (405) responsive to the recovered reference carrier wave for phase-demodulating said input PSK carrier wave into a first demodulated signal;
   clock signal recovery means (411) for providing a clock signal in response to the input PSK modulated carrier wave;
   oscillator means;
   modulator means (407) for phase-modulating the reference carrier wave with the output of the oscillator means (408);
   second demodulator means (406) responsive to the output of said modulator means for phase-demodulating the input PSK modulated carrier wave into a second demodulated signal;
   first discriminator means (412) for discriminating the first demodulated signal into a first digital signal in response to the clock signal;
   second discriminator means (413) for discriminating the second demodulated signal into a second digital signal in response to the clock signal; and
   comparator means (409) for comparing the first digital signal with the second digital signal to provide a pseudo bit error detection signal.

* * * * *

UNITED STATES PATENT AND TRADEMARK OFFICE
CERTIFICATE OF CORRECTION

PATENT NO. : 4,628,507
DATED : December 9, 1986
INVENTOR(S) : Susumu OTANI, Tokyo, Japan It is certified that error appears in the above-identified patent and that said Letters Patent is hereby corrected as shown below:

Column 1, line 48, change "$\Theta_0$" (second occurrence) to --$\Theta_1$--.

Column 4, line 41, delete "even though" and insert --, even though--.

Column 5, line 58, reads "(solid line." it should read --(solid line).--.

Signed and Sealed this

Sixth Day of October, 1987

*Attest:*

DONALD J. QUIGG

*Attesting Officer*    *Commissioner of Patents and Trademarks*